(12) United States Patent
Suzuki

(10) Patent No.: US 9,490,506 B2
(45) Date of Patent: Nov. 8, 2016

(54) BATTERY UNIT

(71) Applicant: MAKITA CORPORATION, Anjo-shi, Aichi (JP)

(72) Inventor: Hitoshi Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 92 days.

(21) Appl. No.: 14/309,124

(22) Filed: Jun. 19, 2014

(65) Prior Publication Data

US 2014/0377594 A1    Dec. 25, 2014

(30) Foreign Application Priority Data

Jun. 21, 2013   (JP) ................................ 2013-130770

(51) Int. Cl.
| | |
|---|---|
| *H01M 10/42* | (2006.01) |
| *H01M 2/34* | (2006.01) |
| *H01M 10/48* | (2006.01) |
| *H02J 7/00* | (2006.01) |

(52) U.S. Cl.
CPC ............. *H01M 10/425* (2013.01); *H01M 2/34* (2013.01); *H01M 10/482* (2013.01); *H02J 7/0063* (2013.01); *H01M 2010/4271* (2013.01); *H02J 7/0024* (2013.01)

(58) Field of Classification Search
None
See application file for complete search history.

(56) References Cited

U.S. PATENT DOCUMENTS

| | | |
|---|---|---|
| 6,346,794 B1 | 2/2002 | Odaohhara |
| 2004/0224195 A1* | 11/2004 | Huang ................. H01M 10/42 429/406 |
| 2004/0228055 A1 | 11/2004 | Pearson |
| 2004/0257041 A1 | 12/2004 | Nagaoka |
| 2011/0133556 A1 | 6/2011 | Choi |
| 2012/0068546 A1 | 3/2012 | Kuramochi et al. |
| 2013/0025893 A1* | 1/2013 | Ota .......................... H02J 1/10 173/2 |

FOREIGN PATENT DOCUMENTS

| | | |
|---|---|---|
| CN | 1574542 A | 2/2005 |
| DE | 10 2011 056377 A1 | 1/2013 |
| EP | 2560264 A2 | 2/2013 |
| JP | H07-143684 A | 6/1995 |
| JP | 2004-229391 A | 8/2004 |
| JP | A-2011-218510 | 11/2011 |
| JP | 2013-102478 A | 5/2013 |
| WO | 2012/017697 A1 | 2/2012 |

OTHER PUBLICATIONS

Mar. 17, 2015 Extended European Search Report issued in European Patent Application No. 14173270.1.
Jan. 15, 2016 Office Action issued in Chinese Patent Application No. 201410276501.2.
Aug. 23, 2016 Office Action issued in Japanese Patent Application No. 2013-130770.

* cited by examiner

*Primary Examiner* — Carlos Barcena
*Assistant Examiner* — Wojciech Haske
(74) *Attorney, Agent, or Firm* — Oliff PLC

(57) ABSTRACT

A battery unit in one aspect of an embodiment of the present disclosure includes a plurality of cell assemblies, a positive electrode connection terminal, a negative electrode connection terminal, a plurality of switch sections, a control section, and a simultaneous on-suppression section. When an on-command signal is output from the control section to at least two of the plurality of the switch sections, the simultaneous on-suppression section performs one of enabling the on-command signal to one of the at least two switch sections and disabling the on-command signal to all of the at least two switch sections, so as to suppress the at least two switch sections from being turned on at the same time.

13 Claims, 7 Drawing Sheets

BATTERY UNIT

CROSS-REFERENCE TO RELATED APPLICATIONS

This application claims the benefit of Japanese Patent Application No. 2013-130770 filed Jun. 21, 2013 with the Japan Patent Office, and the disclosure of which is incorporated herein by reference.

BACKGROUND

The present invention relates to a battery unit with a plurality of cell assemblies.

One type of known battery unit is provided with a plurality of cell assemblies connected in parallel and is configured to be able to supply power to the load of a power supply target from at least one of the plurality of cell assemblies. Each of the plurality of cell assemblies has a plurality of battery cells (hereinafter, simply referred to as "cells") that are connected in series, parallel or series-parallel. For example, as disclosed in Japanese Unexamined Patent Application Publication No. 2011-218510, the battery unit of this type may be configured such that the plurality of cell assemblies are accommodated in a housing or the plurality of cell assemblies are individually attachable and detachable from the battery unit.

In the battery unit like this, in case that the plurality of cell assemblies are simply connected in parallel, there is a possibility that a sneak (backflow) current from one cell assembly to another cell assembly is generated due to differences in the electrical state, etc. between the cell assemblies. Such backflow is less preferred in light of quality maintenance of the battery. The reason is because, if abnormality occurs to one of the cell assemblies, it is possible that an excessive sneak (charge) current from the other parallel-connected cell assemblies to the cell assembly in the abnormal state is generated, thereby worsening the situation.

In contrast, Japanese Unexamined Patent Application Publication No. 2011-218510 discloses an adapter configured to connect a diode to a positive electrode of each battery, and to output a current to the load from each battery via the diode. With this adapter, a sneak current between the parallel-connected batteries is blocked by the diode.

SUMMARY

The method for preventing a sneak current between batteries by a diode, however, involves a large power loss due to the diode. It is possible that reduction in power supplied to the load, heat generation due to the power loss, etc. occur.

It is desirable that one aspect of an embodiment of the present disclosure can suppress a sneak current from occurring between cell assemblies while suppressing a loss of power supplied from each cell assembly.

A battery unit in one aspect of the embodiment of the present disclosure includes a plurality of cell assemblies, a positive electrode connection terminal, a negative electrode connection terminal, a plurality of switch sections, a control section, and a simultaneous on-suppression section.

Each of the plurality of cell assemblies includes a positive electrode, a negative electrode, and an assembled battery. The assembled battery includes a plurality of battery cells that are connected in one of series, parallel, and series-parallel to each other. The positive electrode connection terminal is connected to the positive electrode of each of the plurality of cell assemblies. The negative electrode connection terminal is connected to the negative electrode of each of the plurality of cell assemblies. Note that the positive electrode of the cell assembly means a positive electrode of the assembled battery included in the cell assembly, and the negative electrode of the cell assembly means a negative electrode of the assembled battery included in the cell assembly.

Each of the plurality of switch sections corresponds to one of the plurality of cell assemblies, and is configured to conduct or block a current path between the positive electrode of the corresponding cell assembly and the positive electrode connection terminal. The control section is configured to selectively output an on-command signal for conducting the current path to each of the plurality of switch sections. The simultaneous on-suppression section is configured, when the on-command signal is output to at least two of the plurality of switch sections from the control section, to perform one of enabling the on-command signal to one of the at least two switch sections and disabling the on-command signal to all of the at least two switch sections, so as to suppress the at least two switch sections from being turned on at the same time.

In the battery unit configured as such, the plurality of cell assemblies are not connected in parallel directly but are connected in parallel via the plurality of switch sections. Since the control section selectively turns on one of the plurality of switch sections, the plurality of switch sections are suppressed from being turned on at the same time normally (as long as the control section is normal). Therefore, it is possible to suppress occurrence of a sneak current between the cell assemblies due to parallel connection of the plurality of the cell assemblies. That is, in the embodiment of the present disclosure, unlike the prior art, a sneak current between the cell assemblies is suppressed without using a diode but using the switch sections having a smaller voltage drop (on-resistance) than the diode.

Further, the battery unit in the embodiment of the present disclosure is provided with the simultaneous on-suppression section as described above. With the on-suppression section, even if the on-command signal is output from the control section to the plurality of switch sections, simultaneous turning-on of the plurality of switch sections is suppressed.

Therefore, according to the battery unit in the embodiment of the present disclosure, it is possible to suppress a sneak current between the cell assemblies while suppressing a loss of power from each cell assembly.

Each of the switch sections may be provided with a first switch and a second switch connected in series. Specifically, each of the first switch and the second switch may include a pair of end portions. One end of the pair of end portions of the first switch may be connected to one end of the pair of end portions of the second switch. The other end of the pair of end portions of the first switch may be connected to the positive electrode connection terminal. The other end of the pair of end portions of the second switch may be connected to the positive electrode of the cell assembly corresponding to the switch section provided with the second switch.

Thus, by configuring each switch section using the first switch and the second switch connected in series, even if one of the first switch and the second switch has a short-circuit fault, it is possible to suppress a sneak current from other cell assemblies as long as the other of the first switch and the second switch is normal. That is, it is possible to more effectively suppress the sneak current between the cell assemblies.

Further, each switch section may include a third switch. The third switch may be provided with one end connected to one end of the first switch and one end of the second switch, and the other end separate from the one end. In this case, the battery unit may include a plurality of switching control sections and an abnormality determination section. Each of the switching control sections may correspond to each of the plurality of switch sections, and may be configured to turn off the third switch of the corresponding switch section when the on-command signal is output to the corresponding switch section and to turn on the third switch of the corresponding switch section while the on-command signal is not output to the corresponding switch section. That is, the third switch may operate in reverse logic to the first and second switches in response to the on-command signal from the control section. The abnormality determination section may be configured to determine the presence or absence of abnormality of each of the plurality of switch sections based on an electrical state of the other end of the third switch in each of the plurality of switch sections.

If at least one of the first switch and the second switch in one switch section has a short-circuit fault, there is a possibility that the other end of the third switch turns to an electrically abnormal state (a state that is different from normal operation) through the switch having the short-circuit fault even though the on-command signal is not output to the switch section. Therefore, according to the battery unit configured as described above, a short-circuit fault of the switch section (i.e., a short-circuit fault of at least one of the first switch and the second switch) can be detected.

The abnormality determination section may be further configured to determine the presence or absence of a short-circuit fault of the second switch in each of the plurality of switch sections, based on the electrical state of the other end of the third switch in each of the plurality of switch sections when the on-command signal is not output from the control section.

If the second switch connected to one of the cell assemblies has a short-circuit fault, the voltage of the cell assembly appears directly or indirectly through the second switch and the third switch at the other end of the third switch even if the on-command signal is not output to the cell assembly from the control section. Therefore, it is possible to detect a short-circuit fault of the second switch based on the electrical state (e.g., voltage) of the other end of the third switch.

The battery unit may include a constant voltage generator and a constant voltage applying section. The constant voltage generator is configured to generate a constant voltage having a predetermined voltage value. The constant voltage applying section is configured to apply the constant voltage generated by the constant voltage generator to the other end of the first switch in each of the plurality of switch sections at a predetermined determination timing during a period in which an on-command signal is not output from the control section. In this case, the abnormality determination section may be further configured to determine the presence or absence of a short-circuit fault of the first switch in the plurality of switch sections based on the electrical state of the other end of the third switch in each of the plurality of switch sections when the constant voltage is applied by the constant voltage applying section to the other end of the first switch in each of the plurality of switch sections.

If the first switch connected to one of the cell assemblies has a short-circuit fault, even if the on-command signal is not be output to the cell assembly from the control section, the constant voltage from the constant voltage generator appears directly or indirectly via the constant voltage applying section, the first switch and the third switch to the other end of the third switch. Therefore, it is possible to detect a short-circuit fault of the first switch based on the electrical state (e.g., voltage) of the other end of the third switch.

The simultaneous on-suppression section may be further configured, when the on-command signal is output to at least two of the plurality of switch sections from the control section, to forcibly turn off the at least two of the plurality of switch sections. According to this configuration, all the cell assemblies are forcibly disconnected from the positive electrode connection terminal. Thus, a sneak-current between the plurality of cell assemblies is suppressed. Therefore, it is possible to improve reliability of the battery unit against abnormality of the on-command signal due to abnormality of the control section, etc.

Alternatively, the simultaneous on-suppression section may be further configured, if, while the on-command signal is output to one of the plurality of switch sections from the control section, the on command signal is also output to at least another one of the plurality switch sections from the control section, to permit transmission of the on-command signal to the one of the plurality of switch sections, and to suppress the transmission of the on-command signal to the at least another one of the plurality of switch sections. Such configuration is hereinafter referred to as an on-sustainable configuration.

In the case of the on-sustainable configuration as described above, not all the switch sections are forcibly turned off, and the switch section that has been already turned on is kept on as it is. The switch section to which the on-command signal is output later is not turned on, assuming that the on-command signal is invalid. Therefore, it is possible to suppress the sneak current between the plurality of cell assemblies while enabling supply of battery power through the switch section (electric power supply to the outside through each connection terminal) that has been already turned on to be continued.

The battery unit having the above on-sustainable configuration may be implemented by including a D-type flip-flop that is connected to the control section and the plurality of switch sections. The D-type flip-flop has a plurality of data input terminals, a plurality of data output terminals, a clock signal input terminal, and a clear signal input terminal. Each of the plurality of data input terminals is connected to one of the plurality of switch sections, and the on-command signal output from the control section is input as an input signal to each of the plurality of data input terminals. Each of the plurality of data output terminals corresponds to one of the plurality of switch sections, and an output signal to the input signal is output to the corresponding switch section from each of the plurality of data output terminals. A logical sum of the on-command signals to the respective plurality of switch sections from the control section is input to the clock signal input terminal as a clock signal. A logical sum of the on-command signals to the respective plurality of switch sections from the control section is input to the clear signal input terminal as a clear signal.

With the D-type flip-flop, even if the on-command signal is output to one switch section to turn on the one switch section and the on-command signal is output to another switch section, the clock signal input to the D-type flip-flop does not change. Thus, the on command signal output later is not assumed as an output signal.

Therefore, by transmitting the on command signal from the control section to each of the switch sections via the D-type flip-flop configured as above, a battery unit having the on-sustainable configuration can be constructed with a simple circuit. Accordingly, it is possible to reduce the size of the internal circuit of the battery unit, and further reduce the size and the cost of the battery unit as a whole.

Each of the cell assemblies may further includes a monitoring section. The battery unit may be configured, when abnormality is detected by one of the monitoring sections, to forcibly turn off at least the switch section corresponding to the cell assembly having the monitoring section. Specifically, the monitoring section is configured to monitor a state of the assembled battery and, when detecting an abnormality of the assembled battery, to output an error signal indicating the abnormality. The battery unit may further include a forcing-off section. The forcing-off section is configured to forcibly turn off, irrespective of the presence or absence of the on-command signal, at least the switch section, out of the plurality of switch sections, that corresponds to the cell assembly in which an error signal is output from the monitoring section.

According to the battery unit configured as such, even when abnormality occurs in the cell assembly itself, each of the switch sections is forcibly turned off to suppress parallel connection between the cell assemblies, and connection between each of the cell assemblies and the positive electrode connection terminal is cut off. Therefore, it is possible, even if abnormality occurs in one of the cell assemblies, to inhibit the abnormality from affecting the other cell assemblies or outside of the battery unit, thereby to increase the reliability of the battery unit.

BRIEF DESCRIPTION OF THE DRAWINGS

Hereinafter, the present invention will be described by way of example with reference to the accompanying drawings, in which.

DETAILED DESCRIPTION OF THE PREFERRED EMBODIMENTS

It should be noted that the present invention is not limited to particular means or structures shown in the following exemplified embodiments, and may take various forms without departing from the scope of the present invention. For instance, part of the configuration of the embodiments described below may be replaced with a known configuration having a similar function, may be added to or substituted for the configuration of other embodiments, or may be omitted. Further, a plurality of the embodiments described below may be combined appropriately.

[First Embodiment]

(1) Configuration of an Electric Power Tool

Figure 1:
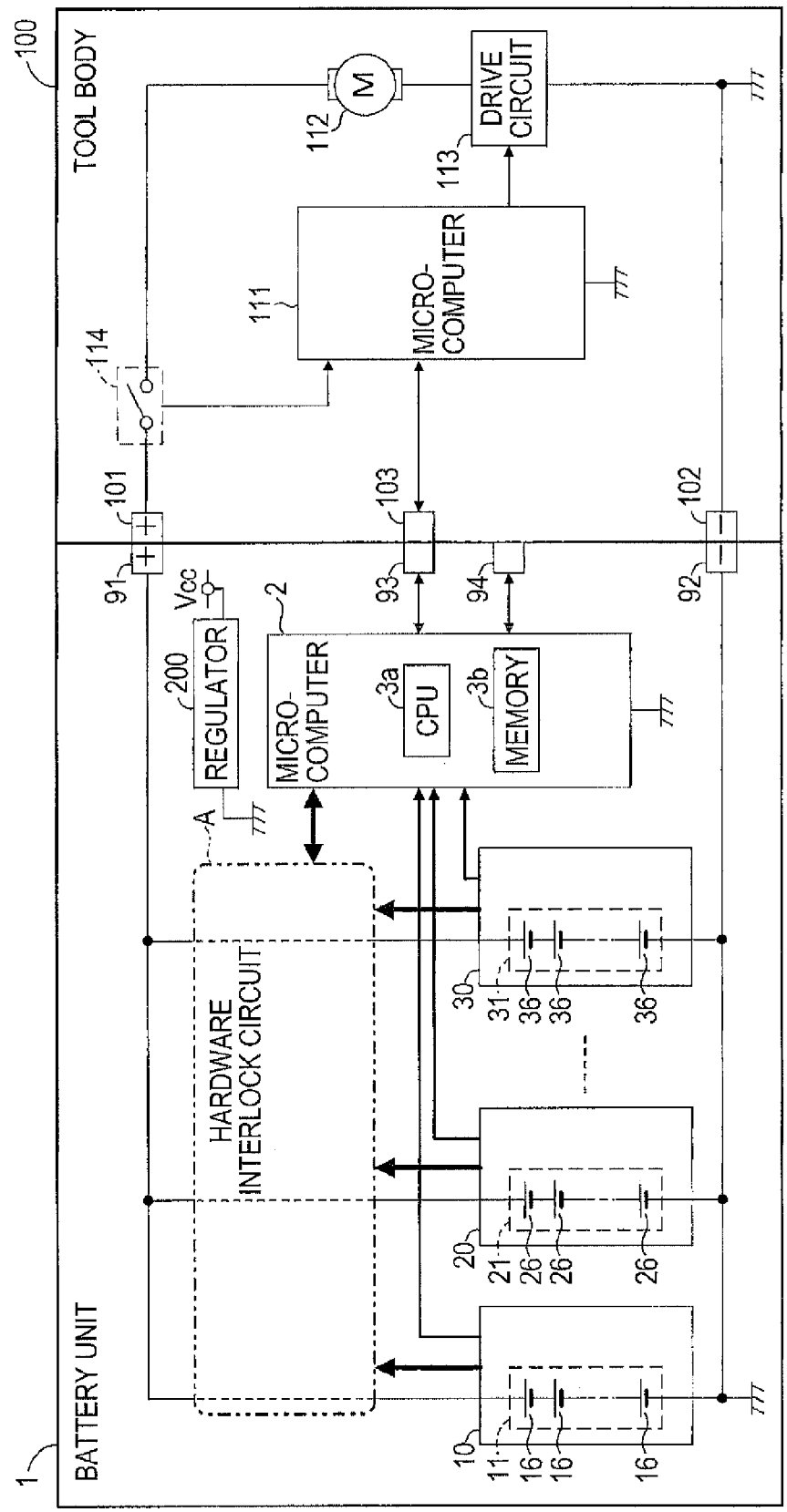
FIG. 1 is a block diagram showing a schematic configuration of an electric power tool according to a first embodiment.

As shown in FIG. 1, an electric power tool of the first embodiment includes a battery unit 1 and a tool body 100. The battery unit 1 is detachably attached to the tool body 100. When the battery unit 1 is attached to the tool body 100, the two components are physically and electrically connected to each other. FIG. 1 shows a state in which the two are connected.

The battery unit 1 includes a plurality (N) of cell assemblies 10, 20, ..., 30, a microcomputer 2, a positive electrode connection terminal 91, a negative electrode connection terminal 92, a first communication terminal 93, and a second communication terminal 94. The plurality of cell assemblies 10, 20, ..., 30 have the same configuration, and respectively include cell blocks 11, 21, ..., 31.

That is, the first cell assembly 10 includes the cell block 11. The cell block 11 is constituted by a plurality of secondary battery cells 16 connected in series. The secondary battery cell according to the first embodiment is a lithium ion secondary battery, but this is merely an example. The secondary battery cell may be other types of secondary battery cells. A positive electrode of the cell block 11 is connected to the positive electrode connection terminal 91 via a hardware interlock circuit A. A negative electrode of the cell block 11 is connected to the negative electrode connection terminal 92.

The other cell assemblies (second cell assembly 20, ..., N-th cell assembly 30) also have the same configuration as the first cell assembly 10. That is, the second cell assembly 20 includes the cell block 21 constituted by a plurality of secondary battery cells 26 connected in series. A positive electrode of the cell block 21 is connected to the positive electrode connection terminal 91 via the hardware interlock circuit A. A negative electrode of the cell block 21 is connected to the negative electrode connection terminal 92. Further, the N-th cell assembly 30 also includes the cell block 31 constituted by a plurality of secondary battery cells 36 connected in series. A positive electrode of the cell block 31 is connected to the positive electrode connection terminal 91 via the hardware interlock circuit A. A negative electrode of the cell block 31 is connected to the negative electrode connection terminal 92.

That is, the cell assemblies 10, 20, ..., 30 are connected in parallel via the hardware interlock circuit A. The hardware interlock circuit A is a circuit for suppressing the plurality of cell assemblies from being directly connected in parallel at the same time. Detailed configuration and operation of the hardware interlock circuit A will be described later.

Voltages of the cell blocks 11, 21, ..., 31 (hereinafter, also referred to as "cell block voltages") have the same values in specs. However, in the first embodiment, the plurality of cell assemblies are controlled so as not to be directly connected in parallel at the same time, as described below. That is, both during charge and discharge, only one of the cell assemblies is permitted to be charged or discharged, and the cell assembly permitted to be charged or discharged is sequentially switched. Therefore, the cell block voltages may vary in practice.

The cell blocks 11, 21, ..., 31 can be charged with a charger 120 (see FIG. 5; details thereof will be described later). Further, in the following description, the term "voltage of the cell assembly" means the voltage of the cell block included in the cell assembly, and the term "positive electrode of the cell assembly" means a positive electrode of the cell block included in the cell assembly.

The microcomputer 2 is provided with an I/O and a timer, both not shown, in addition to a CPU 3 and a memory 3b. When the battery unit 1 is attached to the tool body 100 or the charger 120 (FIG. 5) described later, the positive electrode connection terminal 91 is connected to a positive electrode connection terminal of a target to which the battery unit 1 attached. FIG. 1 shows a state in which the positive electrode connection terminal 91 of the battery unit 1 is connected to a positive electrode connection terminal 101 of the tool body 100.

When the battery unit 1 is attached to the tool body 100 or the charger 120 (FIG. 5) described later, the negative electrode connection terminal 92 is connected to a negative electrode connection terminal of the target to which the battery unit 1 attached, FIG. 1 shows a state in which the negative electrode connection terminal 92 of the battery unit 1 is connected to a negative electrode connection terminal 102 of the tool body 100.

The first communication terminal 93 is connected to a communication terminal 103 of the tool body 100 when the battery unit 1 is attached to the tool body 100. The first communication terminal 93 of the battery unit 1 is connected to the microcomputer 2. The microcomputer 2 is capable of various data communication with a microcomputer 111 of the tool body 100 via the first communication terminal 93 and the communication terminal 103 of the tool body 100.

Figure 5:
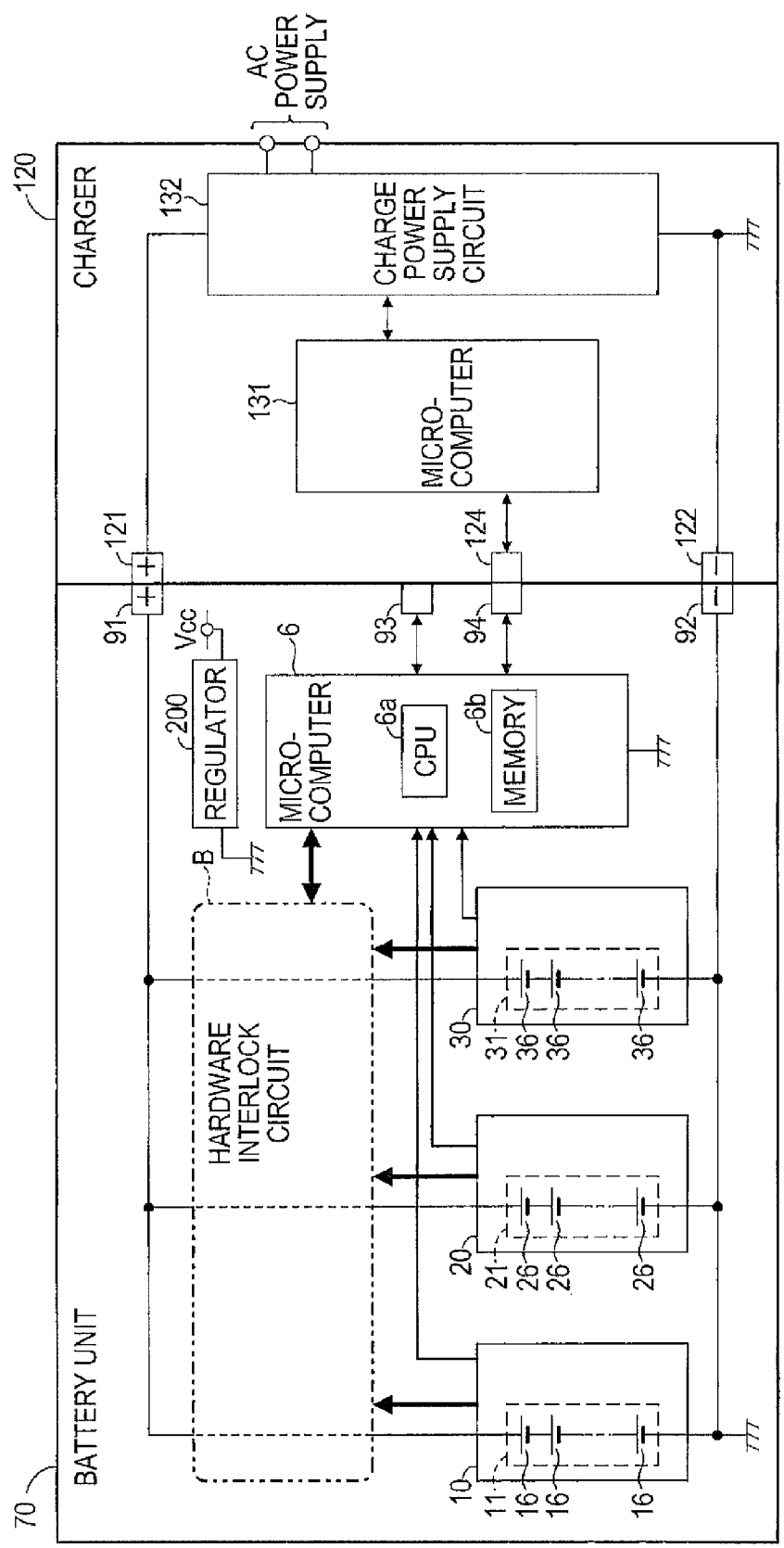
FIG. 5 is a block diagram showing a schematic configuration of a charging system according to a second embodiment.

The second communication terminal 94 is connected to a communication terminal 124 of the charger 120 when the battery unit 1 is attached to the charger 120 (see FIG. 5). The second communication terminal 94 of the battery unit 1 is connected to the microcomputer 2. The microcomputer 2 is capable of various data communication with a microcomputer 131 of the charger 120 via the second communication terminal 94 and the communication terminal 124 of the charger 120.

In addition, the battery unit 1 is provided with a regulator 200 that generates a constant voltage Vcc having a predetermined voltage value (5 V, for example). The regulator 200 generates the constant voltage Vcc from the voltage input via a not shown diode from each of the cell assemblies 10, 20, . . . , 30. That is, the diode is individually provided for each of the cell assemblies 10, 20, . . . , 30, and an anode of each diode is connected to a positive electrode of the corresponding cell assembly 10, 20, . . . , 30. A cathode of each diode is commonly connected to a not shown input terminal of the regulator 200. Each circuit, such as the microcomputer 2 and a self-diagnosis voltage supply circuit 3 (see FIG. 2) described later, in the battery unit 1 operates with the constant voltage Vcc as a power source.

As shown in FIG. 1, the tool body 100 includes the microcomputer 111, a motor 112, a drive circuit 113, a trigger switch 114, the positive electrode connection terminal 101, the negative electrode connection terminal 102, and the communication terminal 103.

The positive electrode connection terminal 101 is connected to one end of the motor 112 via the trigger switch 114. The negative electrode connection terminal 102 is connected to the other end of the motor 112 via the drive circuit 113. The motor 112 in the first embodiment is a brushed direct current motor, but may be a brushless direct current motor.

The trigger switch 114 is turned on and off by a user manipulating a not shown trigger provided to the tool body 100. That is, the trigger switch 114 is turned on when the user pulls the trigger, and is turned off when the user releases the trigger. On and off information of the trigger switch 114 is input to the microcomputer 111.

The microcomputer 111 includes a CPU and a memory, both not shown. The CPU executes various programs stored in the memory to implement various functions. When the trigger switch 114 is turned on, the microcomputer 111 turns on a drive switch of the drive circuit 113, thereby to start power supply to the motor 112 from the battery unit 1 to operate the motor 112. When the trigger switch 114 is turned off, the microcomputer 111 turns off the drive switch of the drive circuit 113, thereby to stop the power supply to the motor 112 from the battery unit 1.

If an abnormality signal is input via the communication terminal 103 from the battery unit 1 while the power is supplied to the motor 112 from the battery unit 1, the microcomputer 111 forcibly stops the power supply to the motor 112.

In addition, although not shown, the tool body 100 is provided with a regulator that generates a constant voltage having a predetermined voltage value. The regulator generates the constant voltage by lowering the voltage supplied from the battery unit 1 when the battery unit 1 is attached to the tool body 100. The microcomputer 111 of the tool body 100 operates with the constant voltage as a power source.

(2) Configuration of the Battery Unit 1

Figure 2:
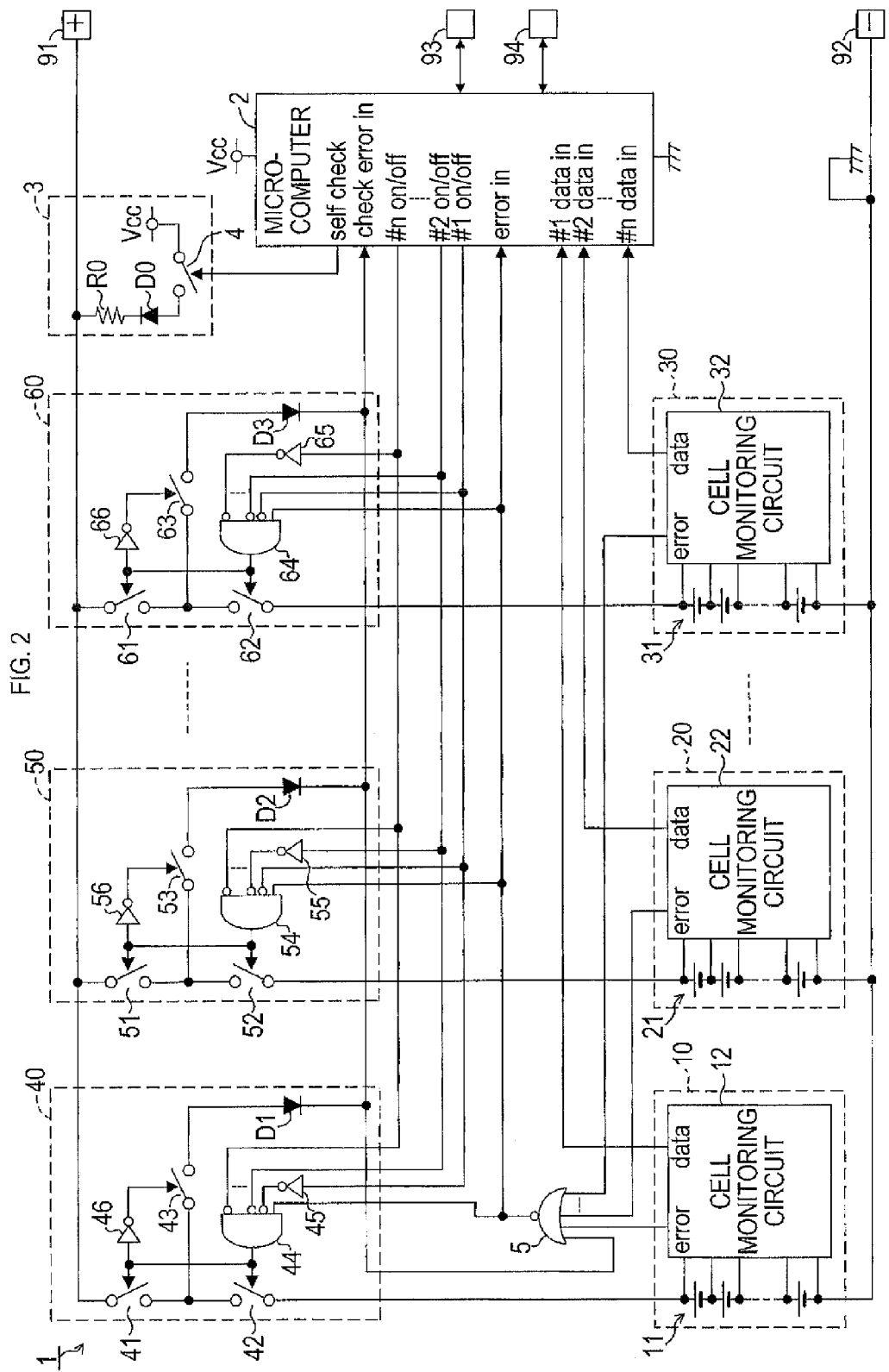
FIG. 2 is a circuit diagram showing an electrical configuration of a battery unit according to the first embodiment.

More detailed configuration of the battery unit 1 will be described with reference to FIG. 2. As shown in FIG. 2, the battery unit 1 includes a plurality (N) of switch circuits 40, 50, . . . , 60 which are provided separately for the cell assemblies 10, 20, . . . , 30, the self-diagnostic voltage supply circuit 3, and a NOR circuit 5. The plurality (N) of switch circuits 40, 50, . . . , 60 constitute the hardware interlock circuit A shown in FIG. 1.

The first cell assembly 10 is provided with a cell monitoring circuit 12 for monitoring the cell block 11 in the first cell assembly 10. The cell monitoring circuit 12 is an integrated circuit (IC) for monitoring the cell block 11. The cell monitoring circuit 12 has a function of detecting the voltage of the cell block 11 and the voltage of each of the cells 16 (cell voltage) and outputting the detection result to the microcomputer 2 from a data terminal. Further, the cell monitoring circuit 12 also has a function of outputting a cell error signal (signal with a logic level "High (H)") to the NOR circuit 5 from an error terminal when abnormality, such as an overvoltage of even one of the cell voltages, occurs in the cell block 11 while monitoring the cell voltage of each of the cells 16. Note that, the logic level of the output of the error terminal is "Low (L)" when the error has not occurred in the cell block 11.

Each of the other cell assemblies 20, . . . , 30 is also provided with a cell monitoring circuit with the same configuration and function as that of the first cell assembly 10. In other words, the second cell assembly 20 is provided with a cell monitoring circuit 22 for monitoring the cell block 21, and the N-th cell assembly 30 is provided with a cell monitoring circuit 32 for monitoring the cell block 31.

The first switch circuit 40, out of the plurality of switch circuits 40, 50, . . . , 60, is provided for the first cell assembly 10. That is, the first switch circuit 40 is provided between a positive electrode of the first cell assembly 10 and the positive electrode connection terminal 91.

The first switch circuit 40 includes a high-side switch 41, a low side switch 42, a self-diagnostic switch 43, an AND circuit 44, two inverters 45, 46, and a diode D1.

One end of the high-side switch 41 is connected to the positive electrode connection terminal 91, and the other end of the high-side switch 41 is connected to one end of the low-side switch 42 and one end of the self-diagnosis switch 43. The other end of the low-side switch 42 is connected to the positive electrode of the first cell assembly 10 (positive electrode of the cell block 11). That is, the cell block 11 of the first cell assembly 10 is connected to the positive electrode connection terminal 91 via the low side switch 42 and the high-side switch 41 connected in series. Hereinafter, the high-side switch 41 and the low-side switch 42 are also referred to as a "switch section" collectively.

The switch section is turned on and off by the output signal from the AND circuit 44. Specifically, the switch section is turned off, when the logic level of the output signal from the AND circuit 44 is "L". The switch section is turned on when the logic level of the output signal from the AND circuit 44 is "H".

The inverter 45 is an input enabling inverter. The inverter 45 inverts the logic of a first charge-discharge enable signal input from the microcomputer 2 and outputs the inverted signal to an inverting input terminal of the AND circuit 44. The inverter 46 is a self-diagnosis inverter. The inverter 46 inverts the logic of the output signal from the AND circuit 44 and outputs the inverted signal to the self-diagnosis switch 43.

One end of the self-diagnosis switch 43 is connected to a connection point between the high side switch 41 and the low-side switch 42. The other end of the self-diagnosis switch 43 is connected to a self-diagnostic error signal input terminal of the microcomputer 2 and the NOR circuit 5 via the diode D1. The self-diagnosis switch 43 is turned off when the logic level of the output signal from the AND circuit 44 is "H", and is turned on when the logic level of the output signal from the AND circuit 44 is "L".

The two switches 41, 42 forming the switch section, and the self-diagnosis switch 43 are in fact semiconductor switches, more specifically, MOSFETs in the first embodiment.

The high-side switch 41 and the low-side switch 42 constituting the switch section are, in fact, both P-channel MOSFETs. Two drains of these two MOSFETs are connected with each other, and are also connected to the self-diagnosis switch 43. A circuit for inverting the logic of the output signal from the AND circuit 44 is connected to each gate of these two MOSFETs. These two MOSFETs are turned off when the logic level of the output signal from the AND circuit 44 is "L", and are turned on when the logic level of the output signal from the AND circuit 44 is "H".

The individual charge-discharge enable signal for each of the switch circuits 40, 50, . . . , 60 output from the microcomputer 2, and an output signal of the NOR circuit 5, are input to the AND circuit 44. All the charge-discharge enable signals are input to the inverting input terminal of the AND circuit 44. Also, the #1 charge-discharge enable signal corresponding to the first switch circuit 40 (corresponding to the first cell assembly 10), out of all the charge-discharge enable signals, is logically inverted by the input enabling inverter 45 and is input to the inverting input terminal of the AND circuit 44.

The AND circuit 44 further logically inverts the inverted logic signal of the #1 charge-discharge enable signal input through the input enabling inverter 45, and also logically inverts each of the charge-discharge enable signals other than the #1 charge-discharge enable signal (#2 charge-discharge enable signal, . . . , #n charge-discharge enable signal). The AND circuit 44 finally outputs a signal indicating a logical product of each of the logically inverted input signals and the output signal from the NOR circuit 5.

The second switch circuit 50 is provided for the second cell assembly 20. That is, the second switch circuit 50 is provided between a positive electrode of the second cell assembly 20 and the positive electrode connection terminal 91.

The second switch circuit 50 has the same configuration as the first switch circuit 40 except a part (connection position of an input enabling inverter 55). That is, the second switch circuit 50 includes a high-side switch 51, a low side switch 52, a self-diagnostic switch 53, an AND circuit 54, two inverters 55, 56, and a diode D2.

Focusing on the difference from the first switch circuit 40, in the second switch circuit 50, the #1 charge-discharge enable signal corresponding to the first cell assembly 10, out of all the charge-discharge enable signals from the microcomputer 2, is directly input to an inverting input terminal of the AND circuit 54 without passing through the inverter.

In the second switch circuit 50, the #2 charge-discharge enable signal corresponding to the second switch circuit 50 (corresponding to the second cell assembly 20) is input to the input enabling inverter 55. The #2 charge-discharge enable signal is logically inverted by the input enabling inverter 55, and is input to the inverting input terminal of the AND circuit 54.

The AND circuit 54 further logically inverts the logically inverted signal of the #2 charge-discharge enable signal input through the input enabling inverter 55, and also logically inverts each of the charge-discharge enable signals other than the #2 charge-discharge enable signal. The AND circuit 54 finally outputs a signal indicating a logical product of each of the logically inverted input signals and the output signal from the NOR circuit 5.

The N-th switch circuit 60 also has the same configuration as the first switch circuit 40 except a part (connection position of an input enabling inverter 65). That is, the N-th switch circuit 60 includes a high-side switch 61, a low side switch 62, a self-diagnostic switch 63, an AND circuit 64, two inverters 65, 66, and a diode D3.

Focusing on the difference from the first switch circuit 40, in the N-th switch circuit 60, each of the charge-discharge enable signals from the microcomputer 2, other than the N-th charge-discharge enable signal, is directly input to an inverting input terminal of the AND circuit 64 without passing through the inverter.

In the N-th switch circuit 60, the #n charge-discharge enable signal corresponding to the N-th switch circuit 60 (corresponding to the N-th cell assembly 30) is input to the input enabling inverter 65. The #n charge-discharge enable signal is logically inverted by the input enabling inverter 65, and is input to the inverting input terminal of the AND circuit 64.

The AND circuit 64 further logically inverts the logically inverted signal of the #n charge-discharge enable signal input through the input enabling inverter 65, and also logically inverts each of the charge-discharge enable signals other than the #n charge-discharge enable signal. The AND circuit 64 finally outputs a signal indicating a logical product of each of the logically inverted input signals and the output signal from the NOR circuit 5.

The self-diagnosis voltage supply circuit 3 includes a resistor R0, a diode D0, and a constant voltage supply switch 4. One end of the resistor R0 is connected to the positive electrode connection terminal 91, and the other end is connected to a cathode of the diode D0. An anode of the diode D0 is connected to one end of the constant voltage supply switch 4. The constant voltage Vcc from the regulator 200 is applied to the other end of the constant voltage supply switch 4.

The constant voltage supply switch 4 is turned on and off by a self-check signal from the microcomputer 2. That is, while the logic level of the self-check signal to the constant voltage supply switch 4 from the microcomputer 2 is "L", the constant voltage supply switch 4 is turned off. While the logic level of the self-check signal is "H", the constant voltage supply switch 4 is turned on. When the constant voltage supply switch 4 is turned on, the constant voltage Vcc is supplied to each of the switch circuits 40, 50, . . . , 60.

The microcomputer 2 selectively sets the logic level of one of the charge-discharge enable signals to the switch circuits 40, 50, . . . , 60 to "H" to turn on the switch section of the switch circuit corresponding to the selected charge-discharge enable signal and connects the positive electrode of the corresponding cell assembly to the positive electrode connection terminal 91. That is, the microcomputer 2 controls the switch circuits 40, 50, 60 so as not to turn on the switch sections of the plurality of different switch circuits at the same time (to suppress the plurality of cell assemblies from being connected in parallel with each other directly or simultaneously) to cause the voltage of one of the cell assemblies to be applied and output to the positive electrode connection terminal 91.

For example, in order to permit charge and discharge of the cell block 11 to the first cell assembly 10, it is assumed that the microcomputer 2 sets the logic level of the #1 charge-discharge enable signal to "H" and the logic level of all the other charge-discharge enable signals to "L". In this case, in the first switch circuit 40, the logic level of the #1 charge-discharge enable signal is inverted to "L" in the input enabling inverter 45. The logically inverted #1 charge-discharge enable signal is input to the inverting input terminal of the AND circuit 44, and is further logically inverted at the input side in the AND circuit 44. Each of the other charge-discharge enable signals is directly input to the inverting input terminal of the AND circuit 44 (i.e., the logic level remains at "L") and is logically inverted at the input side in the AND circuit 44.

The output signal from the NOR circuit 5 is also input to the AND circuit 44. If the battery unit 1 is normal, the logic level of each input signal to the NOR circuit 5 is "L", and thus the logic level of the output signal from the NOR circuit 5 is "H". In other words, the signal with the logic level "H" is usually (as long as there is no abnormality) input to the AND circuit 44 from the NOR circuit 5.

Therefore, the logic level of the output signal from the AND circuit 44 is "H". The switch section (high side switch 41 and low-side switch 42) is turned on, and the self-diagnosis switch 43 is turned off. Thereby, the cell block voltage of the first cell assembly 10 is applied to the positive electrode connection terminal 91 via the switch section, and thus the cell block voltage can be supplied to the outside as the voltage of the battery unit 1 (battery voltage).

Meanwhile, the switch section of each of the switch circuits 50, . . . , 60 other than the first switch circuit 40 is turned off, and all the corresponding cell assemblies 20, . . . , 30 are isolated from the positive electrode connection terminal 91.

For example, in the second switch circuit 50, the #1 charge-discharge enable signal with the logic level "H" is input to the inverting input terminal of the AND circuit 54, and the logic level is inverted to "L" at the input side in the AND circuit 54. Further, since the logic level of the #2 charge-discharge enable signal corresponding to the second switch circuit 50 is "L", the logic level is inverted to "H" in the input enabling inverter 55. The logically inverted #2 charge-discharge enable signal is input to the inverting input terminal of the AND circuit 54, and the logic level is inverted to "L" again at the input side in the AND circuit 54. Therefore, the logic level of the output of the AND circuit 54 turns to "L", and thus the switch section (high-side switch 51 and low-side switch 52) is turned off.

Both during charge and discharge, the microcomputer 2 sequentially turns on the switch section of each of the switch circuits 40, 50, . . . , 60 from the first switch circuit 40. Thereby, the microcomputer 2 permits each of the cell assemblies 10, 20, . . . , 30 to be charged or discharged (connects each of the cell assemblies 10, 20, . . . , 30 to the positive electrode connection terminal 91) one by one.

For example, during discharge, the microcomputer 2 first sets the logic level of the #1 charge-discharge enable signal to "H" to turn on the switch section of the first switch circuit 40, thereby to permit discharge of the first cell assembly 10. When a switching condition to switch the cell assembly permitted to be discharged is satisfied (for example, a discharge completion state is achieved due to decrease in cell block voltage), the logic level of the #1 charge-discharge enable signal is set to "L" to stop the discharge from the first cell assembly 10. Then, the logic level of the #2 charge-discharge enable signal is set to "H" to turn on the switch section of the second switch circuit 50, thereby to permit discharge from the second cell assembly 20. In this way, the microcomputer 2 sequentially switches the cell assembly to be discharged.

Further, for example, during charge by the charger 120 (see FIG. 5), the microcomputer 2 first sets the logic level of the #1 charge-discharge enable signal to "H" to turn on the switch section of the first switch circuit 40, thereby permitting charge to the first cell assembly 10. When a switching condition to switch the cell assembly permitted to be charged is satisfied (for example, the cell block voltage turns to a fully charged state, thereby a charge complete state being achieved), the logic level of the #1 charge-discharge enable signal is set to "L" to stop the charge to the first cell assembly 10. Then, the logic level of the #2 charge-discharge enable signal is set to "H" to turn on the switch section of the second switch circuit 50, thereby permitting charge to the second cell assembly 20. In this way, even during charge, the microcomputer 2 sequentially switches the cell assembly to be charged.

In addition, at a predetermined timing when the logic level of all the charge-discharge enable signals is "L", the microcomputer 2 performs self-diagnosis on whether or not the switch section of each of the switch circuits 40, 50, 60 has a short-circuit fault.

Specifically, at a timing, for example, of switching the cell assembly permitted to be charged or discharged (when the logic level of all the charge-discharge enable signals is turned to "L", in the process of switching), the microcomputer 2 sets the logic level of the self-check signal to the constant voltage supply switch 4 of the self-diagnosis voltage supply circuit 3 to "H" to turn on the constant voltage supply switch 4 for a predetermined time period. Then, on the basis of the signal input to the self-diagnostic error signal input terminal from each of the switch circuits 40, 50, 60 during the on-period, the microcomputer 2 determines (performs self-diagnosis on) the presence or absence of a short-circuit fault in each switch section.

If all the switch sections are normal, when the logic level of all the charge-discharge enable signals is "L", the logic level of the output signal of all the AND circuits 44, 54, ..., 64 turns to "L" and all the switch sections are turned off. Therefore, although all the self-diagnosis switches 43, 53, ..., 63 are turned on, the logic level of the signal input to the self-diagnostic error signal input terminal of the microcomputer 2 from the diodes D1, D2, ..., D3 of all the switch circuits 40, 50, ..., 60 turns to "L". In this case, the microcomputer 2 acknowledges that all the switch sections are normal.

On the other hand, if a short-circuit fault occurs in one of the switch sections, a signal having a logic level "H" (self-diagnostic error signal) is input to the self-diagnostic error signal input terminal of the microcomputer 2. That is, for example, when the high-side switch 41 of the two switches 41, 42 that make up the switch section of the first switch circuit 40 has a short-circuit fault, the constant voltage Vcc from the self-diagnosis voltage supply circuit 3 is input to the microcomputer 2 as a self-diagnostic error signal having a logic level "H" through the high-side switch 41 having a short-circuit fault, the self-diagnostic switch 43, and the diode D1.

Also, for example, when the low-side switch 42 has a short-circuit fault in the first switch circuit 40, the cell block voltage of the first cell assembly 10 is input to the microcomputer 2 as a self-diagnostic error signal having a logic level "H" through the low-side switch 42 having a short-circuit fault, the self-diagnosis switch 43, and the diode D1.

The microcomputer 2 determines that one of the switch sections has a short-circuit fault when the self-diagnostic error signal is input. In addition, the self-diagnostic error signal from the switch circuits 40, 50, ..., 60 is input also to the NOR circuit 5 as well as to the microcomputer 2. Therefore, when the self-diagnostic error signal having a logic level "H" is output from one of the switch circuits, the logic level of the output signal of the NOR circuit 5 turns to "L". The output signal having a logic level "L" from the NOR circuit 5 is input to the error signal input terminal of the microcomputer 2 as an error signal. The microcomputer 2 can detect abnormality also by the error signal.

In the NOR circuit 5, in case that all the switch sections and all the cell assemblies 10, 20, ..., 30 are normal, the logic level of all the input signals turns to "L". Thus, the logic level of the output signal turns to "H". The output signal having a logic level "H" is input to the error signal input terminal of the microcomputer 2 and also to the AND circuits 44, 54, ..., 64. The microcomputer 2 acknowledges that the battery unit 1 is normal by the output signal having a logic level "H".

On the other hand, in case that abnormality occurs in one of the cell assemblies and a cell error signal having a logic level "H" is input to the NOR circuit 5 from the cell monitoring circuit, or a short-circuit fault occurs in one of the switch sections and a self-diagnostic error signal having a logic level "H" is input to the NOR circuit 5 from the corresponding switch circuit at the time of self-diagnosis, the logic level of the output of the NOR circuit 5 turns to "L".

The output signal having a logic level "L" is input to the error signal input terminal of the microcomputer 2 as an error signal. Thereby, the microcomputer 2 acknowledges that abnormality of one of the cell assemblies or a short-circuit fault of one of the switch sections has occurred.

Additionally, when an error signal having a logic level "L" is output from the NOR circuit 5, the error signal is also input to each of the AND circuits 44, 54, ..., 64 of the switch circuits 40, 50, ..., 60. Therefore, the logic level of the output signal of each of the AND circuits 44, 54, ..., 64 is forcibly set to "L". Thereby, all the switch sections are forcibly turned off.

As described above, the microcomputer 2 outputs a charge-discharge enable signal to one of the switch circuits to turn on the switch section of the switch circuit, and permits charge or discharge of only the cell assembly corresponding to the switch circuit, so that the plurality of cell assemblies are not to be connected in parallel at the same time.

However, for some reason, such as due to abnormality in the microcomputer 2, there is a risk of the logic level of the plurality of charge-discharge enable signals from the microcomputer 2 becoming "H". In contrast, the battery unit 1 of the first embodiment is provided with an interlock function, in order to suppress the plurality of switch sections from being turned on simultaneously even though the logic level of the plurality of charge-discharge enable signals from the microcomputer 2 turns to "H" due to some abnormality. Specifically, in the first embodiment, when the logic level of the plurality of charge-discharge enable signals is turned to "H", charge to or discharge from all the cell assemblies are prohibited. The interlock function is implemented by a hardware interlock circuit A constituted by the switch circuits 40, 50, ..., 60 and so on.

In other words, for example, it is assumed that the microcomputer 2 sets the logic level of the #1 charge-discharge enable signal to "H" to permit charge to or discharge from the first cell assembly 10. At this time, the logic level of the output of only the AND circuit 44 of the first switch 40 turns to "H", and the logic level of the output of each of the AND circuits 54, ..., 64 of all the other switches 50, ..., 60 turns to "L". Therefore, only the switch section (high side switch 41 and low-side switch 42) of the first switch is turned on. It is possible to charge or discharge only the first cell assembly 10.

From this state, for example, it is assumed that abnormality occurs in the microcomputer 2, and not only the logic level of the #1 charge-discharge enable signal but also the logic level of the #2 charge-discharge enable signal have turned to "H". At this time, since the #2 charge-discharge enable signal having a logic level "H" is input to the AND circuit 44 of the first switch circuit 40, the logic level of the output signal of the AND circuit 44 is forcibly turned to "L" by the #2 charge-discharge enable signal, regardless of the logic level of the #1 charge-discharge enable signal. Therefore, both the high-side switch 41 and the low-side switch 42 of the first switch circuit 40 are forcibly turned off.

The logic level of the output signal of all the AND circuits 54, ..., 64 of the switch circuits 50, ..., 60 other than the first switch circuit 40 has turned to "L" since the logic level of the #1 charge-discharge enable signal has already turned to "H". Therefore, even if the logic level of the #2 charge-discharge enable signal turns to "H", the logic level of the output signal remains at "L". Thus, all the switch sections of the other switch circuits 50, ..., 60 remain turned off.

As above, since the battery unit 1 of the first embodiment is provided with an interlock function, even if a charge-discharge enable signal is erroneously output from the microcomputer 2 (i.e., in case that the microcomputer 2 incorrectly permits simultaneous charge or discharge of the two or more cell blocks), all the switch sections are turned off, and charge or discharge of all the cell blocks are disabled.

In addition to the sequential switching of the cell assemblies permitted to be discharged or the self-diagnosis function described above, the microcomputer 2 has a function to acquire a state (such as the cell block voltage or the voltage of each cell) of each of the cell assemblies 10, 20, . . . , 30 from each of the cell monitoring circuits 12, 22, . . . , 32 and monitor the status thereof, a function to perform predetermined protective operation when an error signal is input from the NOR circuit 5 or a self-diagnostic error signal is input from one of the switch circuits, a function to make various types of data communication with the tool body 100, a function to make various data communication with the microcomputer 131 (see FIG. 5) of the charger 120 via the second communication terminal 94 when the charger 120 is attached, and so on. The protective operation includes a function to set the logic level of all the charge-discharge enable signals to "L", a function to output an abnormality signal from the first communication terminal 93 and the second communication terminal 94, and the like. Primarily, the various functions including the above described functions provided in the microcomputer 2 are implemented by the CPU 3$a$ executing various programs stored in the memory 3$b$.

It is not essential to implement the function of the microcomputer 2 by a microcomputer. The function of the microcomputer 2 can be implemented in various forms, such as by an IC including various types of logic circuits or the like. For example, the function of the microcomputer 2 may be implemented by combining various individual electronic components, or may be implemented by an ASIC (Application Specified Integrated. Circuit), or may be implemented by a programmable logic device such as, for example, FPGA (Field Programmable Gate Array), or may be implemented by a combination of these. The same applies to the microcomputer 111 of the tool body 100 and the microcomputer 131 of the charger 120 to be described later.

(3) Description of Cell Block Switching Process

Out of the various processes executed by the microcomputer 2 of the battery unit 1, the cell block switching process for controlling switching of the cell assembly permitted to be discharged, including a self-diagnosis function, will be described with reference to FIG. 3. Note that the cell block switching process also includes a process for the self-diagnosis function (self-check process).

Figure 3:
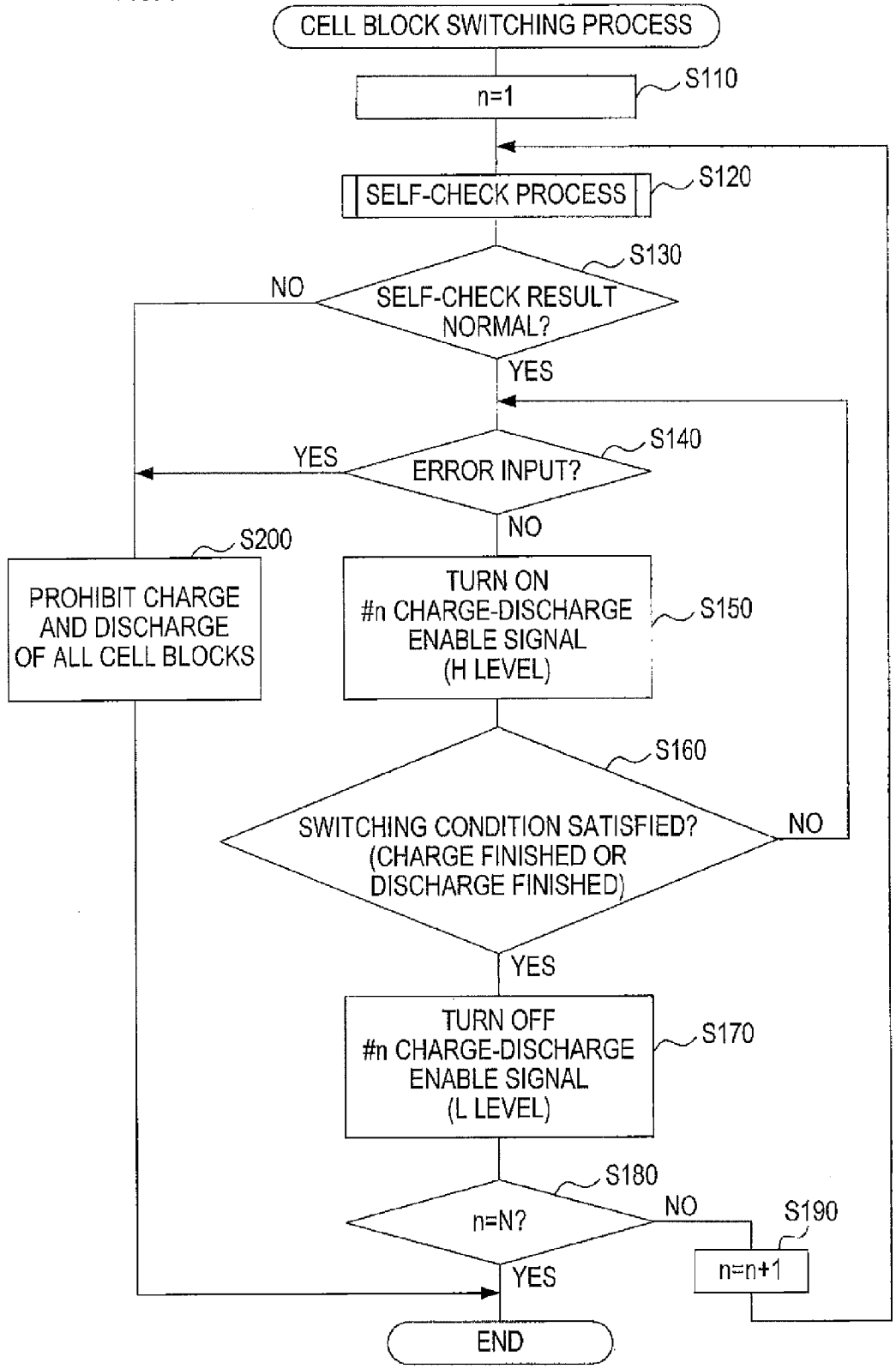
FIG. 3 is a flowchart of a cell block switching process.
Figure 4:
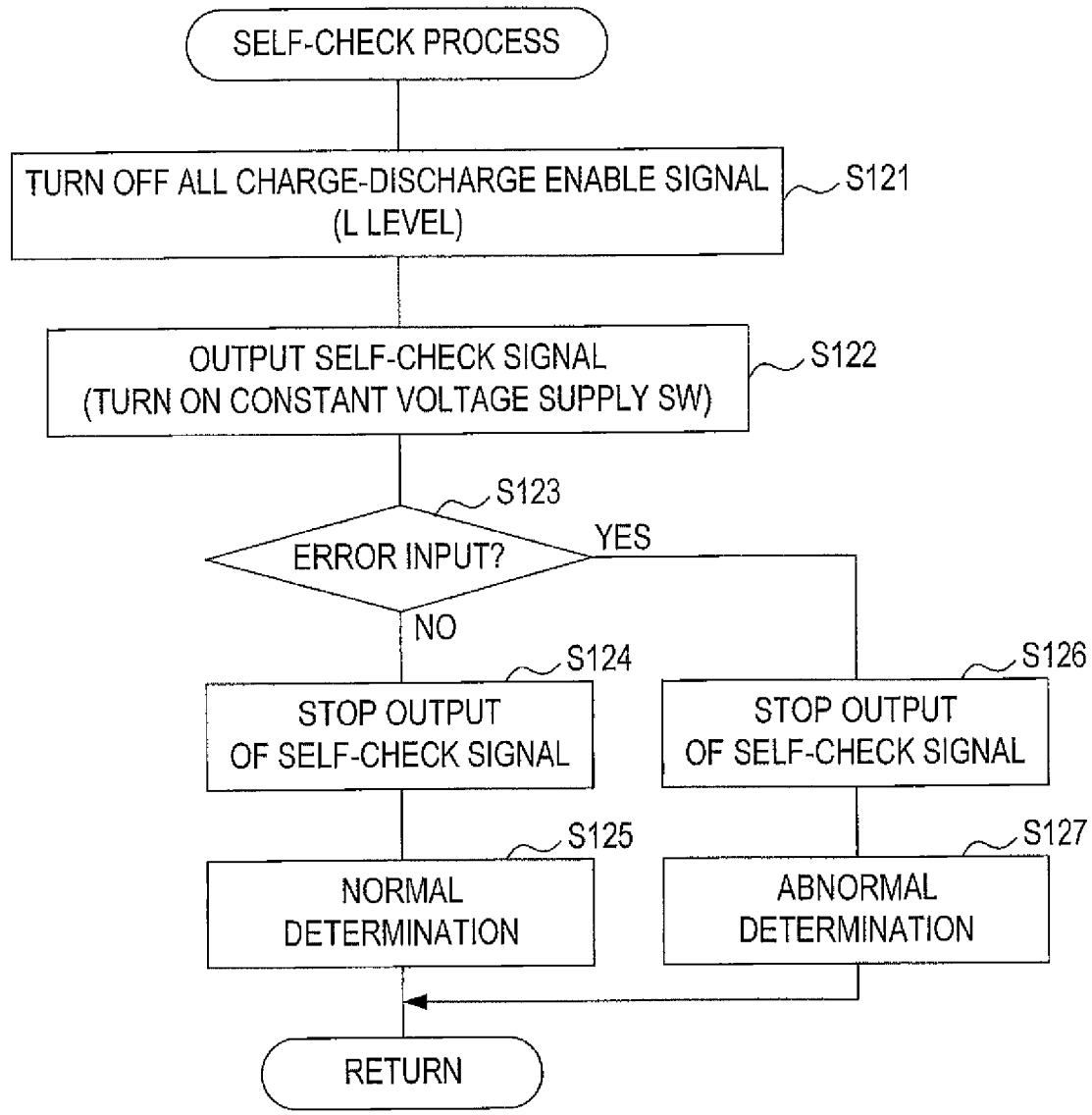
FIG. 4 is a flowchart of a self-check process.

In the microcomputer 2 of the battery unit 1, the CPU 3$a$, when starting to operate, loads a program of the cell block switching process of FIG. 3 from the memory 3$b$, and repeatedly executes the cell block switching process on a regular basis. The CPU 3$a$, when starting the cell block switching process of FIG. 3, sets "1" to a cell block specified variable "n" in S110. In S120, the CPU 3$a$ executes the self-check process. Details of the self-check process are as shown in FIG. 4.

In other words, in S121, all the charge-discharge enable signals are turned off (i.e., the logic level is set to L). In S122, a self-check signal is output to the constant voltage supply switch 4 of the self-diagnostic voltage supply circuit 3, thereby turning on the constant voltage supply switch 4. In S123, it is determined whether or not there is some sort of error input. Specifically, it is determined whether or not at least one of the error signal from the NOR circuit 5 (a signal having a logic level "L") and the self-diagnostic error signal from each of the switch circuits 40, 50, . . . , 60 (a signal having a logic level "H") is input.

If there is no error input, the output of the self-check signal is stopped in S124. In S125, normal determination (determination in which the self check (self-diagnosis) result is normal) is made. The process proceeds to subsequent S130. If there is an error input in S123, the output of the self-check signal is stopped in S126. In S127, abnormality determination (determination in which the self check (self-diagnosis) result is abnormal) is made. The process proceeds to subsequent S130.

Referring back to FIG. 3, it is determined in S130 whether or not the self-check result of the self-check process in S120 is normal. If the self-check result is abnormal, charge or discharge of all the cell blocks are prohibited in S200. The cell block switching process is ended. That is, in S200, all the charge-discharge enable signals are turned off (the logic level is set to "L").

If the self-check result is normal in S130, it is determined in S140 whether there is any error input. The determination process of S140 is the same as that of S123 in FIG. 4. The process proceeds to S200 if there is any error input. The process proceeds to S150 if there is no error input.

In S150, the #n charge-discharge enable signal is turned on (the logic level is set to "H"). For example, in the case of n=1, the #1 charge-discharge enable signal corresponding to the first cell assembly 10 is turned on. Thereby, the cell block of the first cell assembly 10 can be charged or discharged.

In S160, it is determined whether or not the switching condition of the cell block permitted to be charged or discharged is satisfied. That is, it is determined whether or not the voltage of the n-th cell assembly is in a fully charged state during charge, or whether or not the voltage of the n-th cell assembly is in a discharge finished state other than during charge.

If the switching condition of the cell block is not satisfied, the process returns to S140. If the switching condition of the cell block is satisfied, the #n charge-discharge enable signal is turned off (the logic level is set to "L") in S170, thereby prohibiting charge or discharge of the cell block in the n-th cell assembly. At this point, charge or discharge of the cell blocks of all the cell assemblies are once prohibited.

In S180, it is determined whether the cell block specified variable "n" matches the total number "N" of the cell assemblies. If the cell block specified variable "n" does not match the total number "N" of the cell assemblies, the cell block specified variable "n" is incremented by one in S190, and the process returns to S120. In S180, if the cell block specified variable "n" matches the total number "N" of the cell assemblies, the cell block switching process is ended.

(4) Effects, Etc. of the First Embodiment

As described above, in the battery unit 1 of the first embodiment, only the switch section (high-side switch and low-side switch) of one of the switch circuits is selectively turned on by the charge-discharge enable signal from the microcomputer 2. Thus, only one cell assembly of which switch section is turned on becomes chargeable or dischargeable.

With the basic configuration as such, a hardware interlock function is further provided. If the plurality of charge-discharge enable signals to the switch circuits are turned on at the same time due to abnormality of the microcomputer 2, all the charge-discharge enable signals are assumed invalid and charge and discharge of all the cell blocks are prohibited. That is, due to the hardware interlock function, a plurality of switch sections are configured not to be turned on at the same time (in other words, a plurality of assemblies are configured not to be connected in parallel). Therefore, improvement in reliability of the battery unit 1 is achieved against abnormality of the charge-discharge enable signal (i.e., abnormality in which a plurality of charge-discharge enable signals are simultaneously turned on) due to abnormality of the microcomputer 2.

Therefore, according to the battery unit 1 of the first embodiment, it is possible to suppress a loss of power from each cell assembly as compared with the method of suppressing a sneak current between the cell assemblies by connecting the diode to a charge-discharge path as in the prior art. While suppressing the loss of power from each of the cell assemblies, it is possible to suppress the sneak current between the cell assemblies (and unintentional charge by the sneak current).

Also, because the sneak current between the cell assemblies is suppressed using the switch section (high-side switch and low-side switch) having a smaller voltage drop (on-resistance) than the diode, reduction of heat generation, suppression of reduction of the power supplied to the load, and miniaturization of the whole unit are also possible, as compared with the conventional circuit configuration using a diode.

Further, each of the switch sections of the switch circuits 40, 50, . . . , 60 includes two switches (high-side switch and low-side switch) connected in series. Therefore, even if one of the two switches has a short-circuit fault, the sneak current from the other cell assemblies can be suppressed as long as the other switch is normal. That is, it is possible to more effectively suppress the sneak current (unintentional charge) between the cell assemblies.

In particular, in the first embodiment, a semiconductor switch (MOSFET) is used for the high-side switch and the low-side switch. The MOSFET includes a parasitic diode between the source and the drain thereof. Therefore, if the switch section is configured with only one MOSFET, there is a possibility that a sneak current is generated through the parasitic diode, although the MOSFET is turned off. In contrast, in the first embodiment, two MOSFETs are connected in series with a common drain, and the parasitic diodes of the two MOSFETs are connected in series in opposite directions. Therefore, while the two MOSFETs are turned off, currents in both directions are blocked in the switch section. In other words, it is possible to suppress the influence of the parasitic diodes by configuring the switch section by connecting two MOSFETs in series.

Further, by respectively providing the self-diagnosis switches 43, 53, . . . , 63 in the switch circuits 40, 50, . . . , and 60, it is possible to detect a short-circuit fault of the switch section (i.e., short-circuit fault of at least one of the high-side switch and the low-side switch), based on the electrical state of its output terminal.

Specifically, a short-circuit fault of the low-side switch is detectable by an output of the voltage of the cell block connected to the low-side switch from the self-diagnostic switch to the microcomputer 2 via the diode as a self-diagnostic error signal having a logic level "H". On the other hand, a short-circuit fault of the high-side switch can be detected by applying the constant voltage Vcc from the self-diagnosis voltage supply circuit 3.

In addition, the cell assemblies 10, 20, . . . , 30 have the cell monitoring circuits 12, 22, . . . , and 32 respectively. If abnormality is detected in one of the cell monitoring circuits, an error signal having a logic level "L" from the NOR circuit 5 is input to the microcomputer 2, and also input to the AND circuit in each switch circuit. Thus, the logic level of the output signal of the AND circuit is forcibly turned to "L". All the switch sections are forcibly turned off.

Therefore, even when abnormality occurs in the cell assembly itself, each switch section is forcibly turned off to suppress parallel connection of the cell assemblies and to block connection between each cell assembly and the positive electrode connection terminal 91. Therefore, even if abnormality occurs in one of the cell assemblies, it is possible to inhibit the abnormality from affecting the other cell assemblies and the outside of the battery unit 1. Therefore, the reliability of the battery unit 1 can be improved.

The configuration to forcibly turn off all the switch sections when abnormality occurs in a cell assembly is not essential. At least the switch section corresponding to the cell assembly in which the abnormality has occurred may be forcibly turned off,

[Second Embodiment]

Next, a charging system of the second embodiment will be described with reference to FIG. 5. As shown in FIG. 5, the charging system of the second embodiment includes a battery unit 70 and the charger 120. The battery unit 70 is detachably attached to the charger 120. When the battery unit 70 is attached to the charger 120, the two components are connected physically and electrically. FIG. 5 shows a state in which the two are connected.

Compared to the battery unit 1 of the first embodiment, the number of the cell assemblies and part of the configuration of a hardware interlock circuit B are different in the battery unit 70. Otherwise the battery unit 70 has basically the same configuration as the battery unit 1 of the first embodiment.

The battery unit 70 of the second embodiment includes three cell assemblies 10, 20, 30, Each cell assembly 10, 20, . . . , 30 is connected in parallel via the hardware interlock circuit B. The hardware interlock circuit B is also a circuit to suppress a state in which the plurality (three in this example) of cell assemblies are directly connected in parallel at the same time, as is the hardware interlock circuit A of the first embodiment.

The battery unit 70 of the second embodiment can be attached to the tool body 100 of the first embodiment and supply power to the tool body 100. Further, the charger 120 of the second embodiment can also mount the battery unit 1 of the first embodiment and charge the battery unit 1.

As shown in FIG. 5, the charger 120 includes a microcomputer 131, a charge power supply circuit 132, a positive electrode connection terminal 121, a negative electrode connection terminal 122, and a communication terminal 124. The charge power supply circuit 132 includes a rectifier circuit and a switching power supply circuit therein, and rectifies and transforms an alternate current (AC) voltage supplied from an AC power supply, such as a commercial power supply, to generate a direct current voltage for charging the battery unit 1.

Similar to the microcomputer 6 of the battery unit 1, the microcomputer 131 has a CPU and a memory. The microcomputer 131 is capable of data communication with the microcomputer 6 of the battery unit 1 via the communication terminal 124. When the battery unit 1 is attached to the charger 120, the microcomputer 131 controls the charge power supply circuit 132 to supply the charging direct current voltage to the battery unit 1, thereby charging the battery unit 1. After the start of charging, when receiving a charge completion signal through the communication terminal 124 from the microcomputer 6 of the battery unit 1, the microcomputer 131 stops charging. Further, during the charge, when receiving an abnormal signal via the communication terminal 124 from the microcomputer 6 of the battery unit 1, the microcomputer 131 forcibly stops charging.

Figure 6:
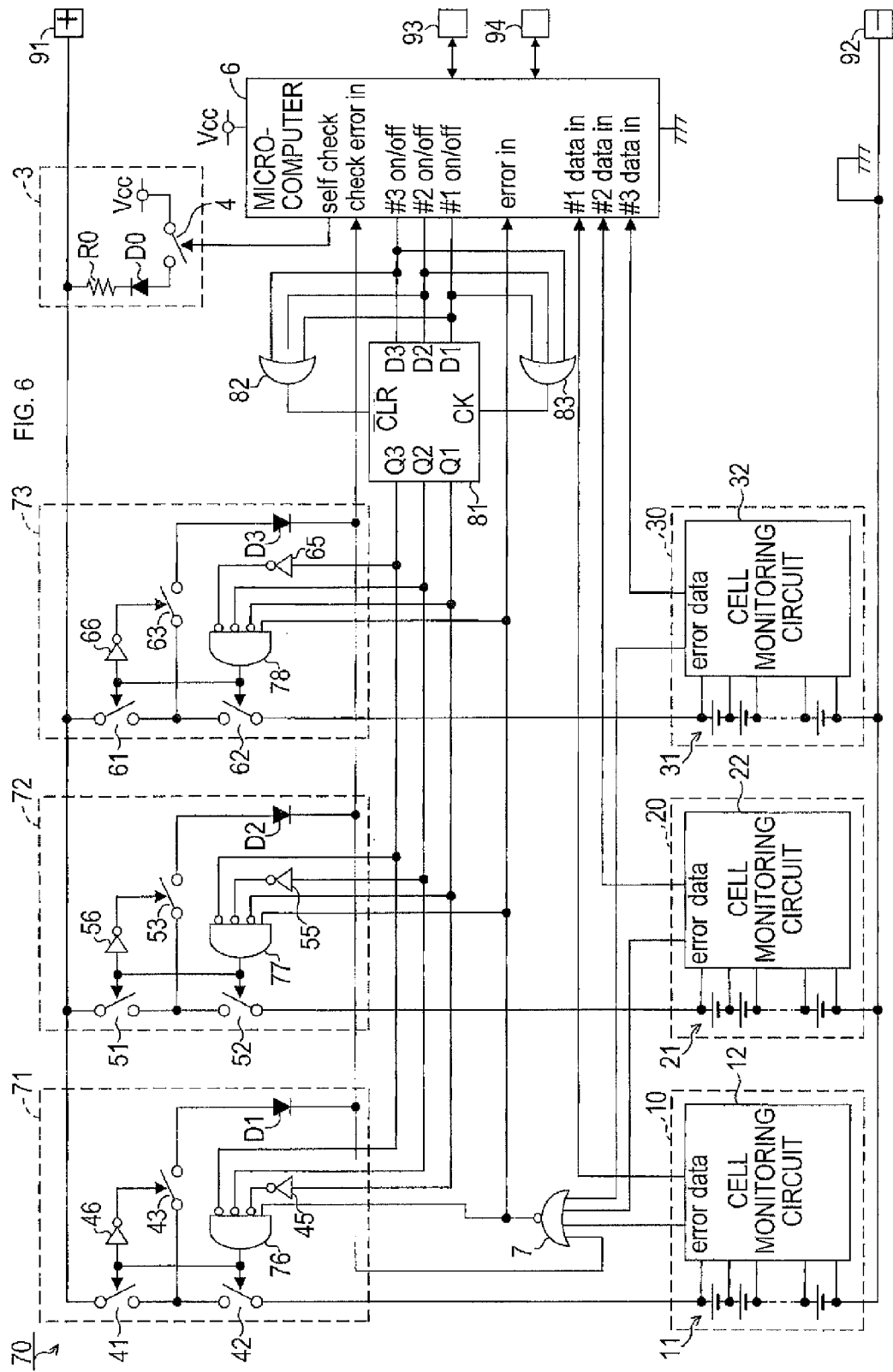
FIG. 6 is a circuit diagram showing an electrical configuration of a battery unit according to the second embodiment.

More specifically, the battery unit 70 is configured as shown in FIG. 6. As shown in FIG. 6, the battery unit 70 of the second embodiment is also provided with a switch circuit in each cell assembly. That is, the first cell assembly 10 is connected to the positive electrode connection terminal 91 via a first switch circuit 71, the second cell assembly 20 is connected to the positive electrode connection terminal 91 via a second switch circuit 72, and the third cell assembly 30 is connected to the positive electrode connection terminal 91 via a third switch circuit 73.

Except that the configuration of the AND circuit is partially different, the configuration of the switch circuits 71, 72 and 73 are the same as the switch circuits 40, 50, . . . , 60 of the first embodiment. Since in the second embodiment, there are three cell assemblies, the AND circuits 76, 77, 78 are configured such that three charge-discharge enable signals corresponding to the three cell assemblies 10, 20 and 30 are input. However, to the AND circuits 76, 77, 78, the charge-discharge enable signal corresponding to the AND circuit itself, out of the three charge-discharge enable signals, is logically inverted by the input enabling inverter and is input, as in the first embodiment.

In the second embodiment, also the NOR circuit 7 is configured such that a cell error signal is input from each of the cell monitoring circuits 12, 22, 32 of the three cell assemblies 10, 20, 30, since there are the three cell assemblies.

The biggest difference in the battery unit 70 of the second embodiment, from the battery unit 1 of the first embodiment, is that the battery unit 70 includes a D-type flip-flop 81 and two OR circuits 82, 83. That is, three charge-discharge enable signals from the microcomputer 6 are input via the D-type flip-flop 81, instead of being directly input to the switch circuits 71, 72, 73.

That is, in the second embodiment, the three switch circuits 71, 72, 73, the D-type flip-flop 81 and the two OR circuits 82, 83 constitute the hardware interlock circuit B. In the first embodiment, when the plurality of charge-discharge enable signals are turned on (the logic level turns to "H"), charge and discharge of all the cell blocks are prohibited. In contrast, the hardware interlock circuit B of the second embodiment equipped with the D-type flip-flop 81, when one of the cell blocks is permitted to be charged or discharged and if the charge-discharge enable signal for another cell block is incorrectly turned on due to abnormality of the microcomputer 6, disables the charge-discharge enable signal turned on by mistake and maintains the charge-discharge enable signal originally turned on to continue to permit the charge or discharge.

That is, the D-type flip-flop 81 is provided with three input terminals D1, D2, D3, three output terminals Q1, Q2, Q3, a clock terminal CK, and a clear terminal CLR. The corresponding charge-discharge enable signal of the three charge-discharge enable signals is input to each of the three input terminals D1, D2, D3.

The output terminal Q1 corresponding to the input terminal D1 to which the #1 charge-discharge enable signal is input is connected to the input enabling inverter 45 of the corresponding first switch circuit 71, and is also connected to the AND circuits 77, 78 of the other switch circuits 72, 73. The output terminal Q2 corresponding to the input terminal D2 to which the #2 charge-discharge enable signal is input is connected to the input enabling inverter 55 of the corresponding second switch circuit 72, and is also connected to the AND circuits 76, 78 of the other switch circuits 71, 73. The output terminal Q3 corresponding to the input terminal D3 to which the #3 charge-discharge enable signal is input is connected to the input enabling inverter 65 of the corresponding third switch circuit 73, and is also connected to the AND circuits 76, 77 of the other switch circuits 71, 72.

The three charge-discharge enable signals are input to the clear OR circuit 82. Then, the logical sum of the three charge-discharge enable signals is input, as a clear signal, to the clear terminal CLR of the D-type flip-flop 81 from the clear. OR circuit 82.

The three charge-discharge enable signals are input to the clock OR circuit 83. Then, the logical sum of the three charge-discharge enable signals is input, as a clock signal, to the clock terminal CK of the D-type flip-flop 81 from the clock OR circuit 83.

In the D-type flip-flop 81, when the logic level of the clear signal is "L", the output of each output terminals Q1, Q2, Q3 is cleared, and the logic level thereof turns to "L". Further, at the rising edge of the clock signal, the input signals to the input terminals D1, D2, D3 at the time are respectively output from the corresponding output terminals Q1, Q2, Q3.

Thus, for example, when a state in which all the charge-discharge enable signals are off (logic level: "L") is changed to a state in which the first charge-discharge enable signal is on (logic level: "H"), the first charge-discharge enable signal having a logic level "H" is input to the input terminal D1 of the D-type flip-flop 81. Further, by the first charge-discharge enable signal, the logic level of the output of both the two OR circuits 82, 83 are turned to "H" from "L". That is, the rising edge of the clock signal occurs. Therefore, the logic level of the output signal Q1 corresponding to the first charge-discharge enable signal of the three output signals turns to "H". Thus, the switch section (high side switch 41 and low-side switch 42) of the first switch circuit 71 is turned on, the positive electrode of the cell block 11 of the first cell assembly 10 is connected to the positive electrode connection terminal 91, and charge and discharge is enabled.

In this state, it is assumed that, due to abnormality of the microcomputer 6, the second charge-discharge enable signal is also turned on (logic level; "H"). Even if the logic level of the second charge-discharge enable signal turns to "H" in a state where the logic level of the first charge-discharge enable signal is already set to "H", the logic level "H" of the clock signal does not change. In other words, the rising edge of the clock signal does not occur. Therefore, the fact that the logic level of the second charge-discharge enable signal is turned to "H" is not transmitted to the output terminal side, and the second charge-discharge enable signal having a logic level "H" is disabled. Then, the first charge-discharge enable signal already having a logic level of "H" continues to enable to function. Thus, a charge-discharge permitted state of the first cell assembly 10 is continued.

As described above, the battery unit 70 of the second embodiment is configured such that each of the charge-discharge enable signals from the microcomputer 6 is output to each of the switch circuits 71, 72, 73 via the D-type flip-flop 81. Accordingly, even if the switch section of one of the switch circuits is turned on and the logic level of the charge-discharge enable signal to the another switch circuit turns to "H", transmission of the charge-discharge enable signal is suppressed or blocked. In other words, only the switch section that is already on is continued (permitted) to be on, and the charge-discharge enable signal to the another switch is disabled.

Therefore, it is possible to suppress the sneak current between the plurality of cell assemblies while enabling to continue supply of the battery power through the one switch circuit that is already turned on.

Also, such function is implemented with a simple configuration using the D-type flip-flop 81 and the two OR circuits 82, 83. Therefore, while including the function, it is possible to reduce the size of the internal circuit of the battery unit 70, and further reduce the size and cost of the battery unit 70 as a whole.

[Other Embodiments]

(1) In the first and the second embodiments, the switch section includes two switches (high-side switch and low-side switch). The switch section may include one switch or three or more switches. However, when using a device like a MOSFET which includes a parasitic diode, as a switch, the switch section may be constructed so that a sneak current through the parasitic diode does not occur, such as by connecting a plurality of switches in series.

(2) The high-side switch and the low-side switch constituting the switch section and the self-diagnosis switch may be a semiconductor switch other than a MOSFET, or may be a switch (relay, for example) other than a semiconductor switch.

(3) In the first and the second embodiments, the hardware interlock circuits are configured using a plurality of switch circuits. Such configurations are only examples. The hardware interlock circuit can take various specific configurations.

As for the specific configuration of the switch circuit as well, the circuit configurations shown in FIGS. 2 and 6 are only examples. The switch circuit may be implemented by another circuit configuration.

(4) In the second embodiment, by using the D-type flip-flop 81, charge or discharge of one cell block is continued to be permitted while charge or discharge of the other cell blocks are prohibited. The same function may be implemented without using the D-type flip-flop 81 but using other various logic circuits.

(5) In the first and the second embodiments, when a cell error signal is output from the cell monitoring circuit of one of the cell assemblies, the logic level of the output of all the AND circuits is set to "L", and charge or discharge of all the cell blocks are prohibited. However, it is not always necessary to prohibit charge or discharge of all the cell blocks. For example, if an error is detected in the cell monitoring circuit of one of the cell assemblies, charge or discharge of only the cell block of that cell assembly may be inhibited.

(6) Each cell assembly may be configured individually attachable and detachable from the battery unit.

Figure 7B:
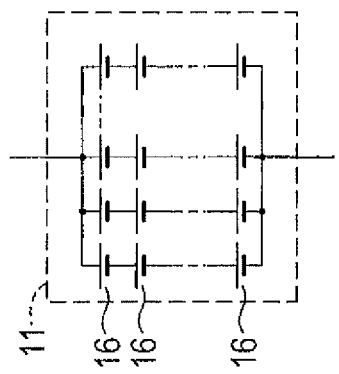
FIGS. 7A and 7B are circuit diagrams showing variations of the cell block.
Figure 7A:
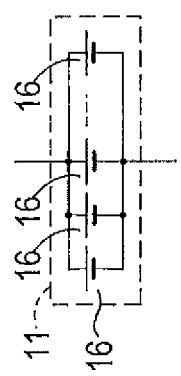

(7) The number of the cells constituting the cell block and the topology may differ from the aforementioned first and second embodiments. That is, the cell block may have a configuration in which the plurality of cells 16 are connected in parallel as the cell block 11 illustrated in FIG. 7A, or may have a configuration in which a plurality of sets of the plurality cells 16 connected in series are connected in parallel (configured to be connected in series-parallel) as the cell block 11 illustrated in FIG. 7B.

(8) When an error is detected in one of the cell monitoring circuits, or one of the switch sections of the switch circuits has a short-circuit fault, occurrence of such abnormality in the battery unit may be notified by using a display element that is arranged appropriately in the battery unit.

Further, in that case, such notification may be given to the user in a manner that a portion to which the abnormality has occurred, such as in which cell assembly the abnormality has occurred or which switch section has a short-circuit fault, can be seen by the user. Specifically, for example, a 7-segment LED may be arranged in the battery unit 7 so as to display the number corresponding to the cell assembly in which the abnormality has occurred, or a plurality of display elements may be arranged to notify the user of abnormality using the number of the display elements corresponding to the cell assembly in which abnormality has occurred.

As described above, by the configuration which permits notification of occurrence of abnormality and the occurrence site, a user or a repair operator of the battery unit can easily recognize the occurrence site of the abnormality when abnormality occurs in the battery unit. Rapid maintenance is possible.

What is claimed is:

1. A battery unit comprising:
   a plurality of cell assemblies, each of the plurality of cell assemblies having a positive electrode, a negative electrode, and an assembled battery, the assembled battery having a plurality of battery cells that are connected in one of series, parallel, and series-parallel to each other;
   a positive electrode connection terminal that is connected to the positive electrode of each of the plurality of cell assemblies;
   a negative electrode connection terminal that is connected to the negative electrode of each of the plurality of cell assemblies;
   a plurality of switch sections, each of the plurality of switch sections corresponding to one of the plurality of cell assemblies, and being configured to conduct or block a current path between the positive electrode of the corresponding cell assembly and the positive electrode connection terminal;
   a control section that is configured to selectively output an on-command signal for conducting the current path to each of the plurality of switch sections;
   a simultaneous on-suppression section that is configured, when the on-command signal is output from the control section to at least two of the plurality of switch sections, to perform one of (i) enabling the on-command signal to only one of the at least two switch sections and (ii) disabling the on-command signal to all of the at least two switch sections, so as to suppress the at least two switch sections from being simultaneously turned on and to suppress positive electrodes of at least two of the plurality of cell assemblies corresponding to the at least two switch sections from being simultaneously connected to the positive electrode connection terminal.

2. The battery unit according to claim 1, wherein
   each of the plurality of switch sections comprises a first switch and a second switch that are connected in series,
   each of the first switch and the second switch comprises a pair of end portions, a first end of the pair of end portions of the first switch is connected to a first end of the pair of end portions of the second switch, a second end of the pair of end portions of the first switch is connected to the positive electrode connection terminal, and a second end of the pair of end portions of the second switch is connected to the positive electrode of the cell assembly corresponding to the switch section provided with the second switch.

3. The battery unit according to claim 2, wherein
   each of the plurality of switch sections comprises a third switch, the third switch being provided with a first end connected to the first end of the first switch and the first end of the second switch, and a second end separate from the first end of the third switch, and
   the battery unit further comprises:
   a plurality of switching control sections, each of the plurality of switching control sections corresponding to each of the plurality of switch sections, and each of the plurality of switching control sections being configured to turn off the third switch of the corresponding switch section when the on-command signal is output to the corresponding switch section and to turn on the third switch of the corresponding switch section while the on-command signal is not output to the corresponding switch section; and an abnormality determination section that is configured to determine the presence or absence of abnormality in each of the plurality of switch sections based on an electrical state of the second end of the third switch in each of the plurality of switch sections.

4. The battery unit according to claim 3, wherein the abnormality determination section is further configured to determine the presence or absence of a short-circuit fault of the second switch in each of the plurality of switch sections, based on the electrical state of the second end of the third switch in each of the plurality of switch sections when the on-command signal is not output from the control section.

5. The battery unit according to claim 3, further comprising:

a constant voltage generator that is configured to generate a constant voltage having a predetermined voltage value; and a constant voltage applying section that is configured to apply the constant voltage generated by the constant voltage generator to the second end of the first switch in each of the plurality of switch sections at a predetermined determination timing during a period in which the on-command signal is not output from the control section, wherein the abnormality determination section is further configured to determine the presence or absence of a short-circuit fault of the first switch in the plurality of switch sections, based on the electrical state of the second end of the third switch in each of the plurality of switch sections when the constant voltage is applied by the constant voltage applying section to the second end of the first switch in each of the plurality of switch sections.

6. The battery unit according to claim 1, wherein the simultaneous on-suppression section is further configured, when the on-command signal is output to the at least two of the plurality of switch sections from the control section, to forcibly turn off the at least two of the plurality of switch sections.

7. The battery unit according to claim 1, wherein the simultaneous on-suppression section is further configured, if, while the on-command signal is output to one of the plurality of switch sections from the control section, the on-command signal is also output to at least another one of the plurality of switch sections from the control section, to permit transmission of the on-command signal to the one of the plurality of switch sections, and to suppress transmission of the on-command signal to the at least another one of the plurality of switch sections.

8. The battery unit according to claim 7, further comprising:

a D-type flip-flop that is connected to the control section and the plurality of switch sections, the D-type flip-flop comprising:

a plurality of data input terminals, each of the plurality of data input terminals connected to one of the plurality of switch sections, the on-command signal output from the control section being input as an input signal to each of the plurality of data input terminals;

a plurality of data output terminals, each of the plurality of data output terminals corresponding to one of the plurality of switch sections, an output signal to the input signal being output to the corresponding switch section from each of the plurality of data output terminals;

a clock signal input terminal to which a logical sum of the on-command signals to the respective plurality of switch sections from the control section is input as a clock signal; and a clear signal input terminal to which the logical sum of the on-command signals to the respective plurality of switch sections from the control section is input as a clear signal.

9. The battery unit according to claim 1, wherein each of the plurality of cell assemblies further includes a monitoring section that is configured to monitor a state of the assembled battery and, when detecting an abnormality of the assembled battery, to output an error signal indicating the abnormality, and the battery unit further comprises:

a forcing-off section that is configured to forcibly turn off, irrespective of the presence or absence of the on-command signal, at least the switch section, out of the plurality of switch sections, that corresponds to the cell assembly in which the error signal is output from the monitoring section.

10. The battery unit according to claim 1, wherein the plurality of cell assemblies are accommodated in the battery unit.

11. The battery unit according to claim 1, wherein the plurality of cell assemblies are integrated with the battery unit.

12. The battery unit according to claim 1, wherein the plurality of cell assemblies are undetachably provided with the battery unit.

13. The battery unit according to claim 1, wherein each of the plurality of cell assemblies is connected to a corresponding one of the plurality of switch sections without a diode.

* * * * *